US008301782B2

(12) United States Patent
Kota et al.

(10) Patent No.: US 8,301,782 B2
(45) Date of Patent: Oct. 30, 2012

(54) STATELESS GATEWAYS HAVING REMOTE DIALOG STORE

(75) Inventors: Jayarama K. Kota, Mountain View, CA (US); Rajanikanth Vemulapalli, San Jose, CA (US); Ming J. Lu, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 341 days.

(21) Appl. No.: 11/713,330

(22) Filed: Mar. 2, 2007

(65) Prior Publication Data

US 2008/0212766 A1    Sep. 4, 2008

(51) Int. Cl.
G06F 15/16 (2006.01)
(52) U.S. Cl. ............... 709/228; 709/204; 709/217
(58) Field of Classification Search ............... 709/227, 709/228
See application file for complete search history.

(56) References Cited

U.S. PATENT DOCUMENTS

| 7,457,279 | B1 | 11/2008 | Scott et al. | |
|---|---|---|---|---|
| 2003/0140103 | A1 | 7/2003 | Szeto et al. | |
| 2004/0030750 | A1 | 2/2004 | Moore et al. | |
| 2004/0037271 | A1 | 2/2004 | Liscano et al. | |
| 2004/0054735 | A1 | 3/2004 | Daniell et al. | |
| 2004/0068567 | A1 | 4/2004 | Moran et al. | |
| 2005/0078642 | A1* | 4/2005 | Mayer et al. | 370/338 |
| 2005/0213537 | A1 | 9/2005 | Ingimundarson et al. | |
| 2007/0036144 | A1* | 2/2007 | Raghav et al. | 370/352 |
| 2007/0083675 | A1 | 4/2007 | Vemulapelli et al. | |
| 2009/0006598 | A1* | 1/2009 | Cosmadopoulos et al. | 709/223 |

FOREIGN PATENT DOCUMENTS

| EP | 1 549 024 A1 | 6/2005 |
|---|---|---|
| WO | WO-03/094011 A1 | 11/2003 |
| WO | WO-2004/059417 A2 | 7/2004 |
| WO | WO-2004/059417 A3 | 7/2004 |

OTHER PUBLICATIONS

Donovan, Session Timers in the Session Initiated Protocol (SIP), Request for Comments (RFC) 4028, Apr. 2005.*
International Search Report mailed on Dec. 27, 2006, for PCT Patent Application No. PCT/US2006/038728 filed on Oct. 3, 2006, six pages.

(Continued)

*Primary Examiner* — Patrice Winder
*Assistant Examiner* — Neeraj Utreja
(74) *Attorney, Agent, or Firm* — James J. DeCarlo; Greenberg Traurig, LLP

(57) ABSTRACT

Gateway apparatus for facilitating communications using a stateful protocol (e.g., SIP or SIP/SIMPLE protocol). The gateway apparatus includes a plurality of gateway devices and a remote dialog store, wherein each of the plurality of gateway devices comprises export logic for causing dialog information associated with a first received message (e.g., a request or response) to be communicated to the dialog store, and retrieval logic for causing a lookup of the dialog information in response to a second received message, the second received message associated with the first received message. In one example the gateway devices are stateless, thereby relying on the dialog store for validating and routing messages. In another example, the gateway devices are stateful and rely on the dialog store for backup (e.g., if a gateway device crashes). The gateway devices may be configured for receiving and processing messages according to SIP protocol or SIP/SIMPLE protocol.

18 Claims, 5 Drawing Sheets

OTHER PUBLICATIONS

Rosenberg, J. (Oct. 18, 2004). "A Framework for Conferencing with the Session Initiation Protocol Draft-Ietf-Sipping-Conferencing-Framework-03," *Internet Engineering Task Force (IETF)* pp. 36 pages.

Rosenberg, J. et al. (2002). "SIP: Session Initiation Protocol," located at <http://tools.ietf.org/rfc/rfc3261.txt>, last visited on Apr. 19, 2007, 252 pages.

U.S. Appl. No. 11/528,753, filed Sep. 27, 2006, for Vemulapelli et al.

International Preliminary Report on Patentability and Written Opinion mailed on Apr. 17, 2008 for PCT Application No. PCT/US2006/038728, filed on Oct. 3, 2006, five pages.

Non-Final Office Action mailed on May 29, 2009, for U.S. Appl. No. 11/528,753, filed Sep. 27, 2006, twenty-two pages.

\* cited by examiner

STATELESS GATEWAYS HAVING REMOTE DIALOG STORE

CROSS-REFERENCE TO RELATED APPLICATION

This application is related to previously filed U.S. patent application Ser. No. 11/528,753, filed Sep. 27, 2006, entitled INSTANT MESSAGING INTEROPERABILITY BETWEEN DISPARATE SERVICE PROVIDERS, which is hereby incorporated by reference as if fully set forth herein.

BACKGROUND

1. Field of the Invention

This invention relates generally to gateway devices and architectures used with signaling frameworks for maintaining session characteristics between two clients, e.g., as used with an instant messaging application or Voice over IP (VoIP) application.

2. Related Art

Many applications utilize signaling frameworks for tracking and maintaining session characteristics between two clients. One illustrative example includes instant messaging applications. Instant messaging applications generally enable two or more participants to communicate over a computer network, such as the Internet or an internet (e.g., a private network), in more or less real time. Typically, each participant uses a client computer system to send and receive messages (including, e.g., text, voice, files, and the like) via a user interface. Each client computer in communication is connected via a network to a common instant messaging service provider and connection server. The connection server receives and processes messages from participants, including by forwarding them to the client systems of the other participants for display. The connection server may also be configured to send messages on behalf of the system, such as to inform participants that a fellow participant has disconnected or logged off.

Typically, instant messaging application software is installed at each client system to enable the client system to be used as an instant messaging client. The instant messaging software may be made available for download, for example, from a web page accessible via the Internet. A user invokes this software on the client system in order to communicate by instant messaging with one or more other participants. The client side application software typically establishes a connection between the client system and the connection server and either automatically logs the user into the connection server or prompts the user to enter the information necessary to log in, such as a user name and password. The user may then communicate by means of instant messaging with one or more other users of the instant messaging system. There are several known instant messaging systems and service providers, such as MSN® Messenger, Yahoo!® Messenger, AOL® Instant Messenger ("AIM"), and the like.

Generally, a service provider comprises a plurality of gateway devices for validating and routing traffic between clients (and between service provider networks). For example, a service provider network may include gateway devices for receiving and communicating signaling events to and from their native protocol to a common protocol such as SIP. Such gateway devices are stateful, e.g., monitoring details of the dialogs (i.e., the interactions/exchanges of information between communication computers such as responses and requests). For example, with respect to an instant messaging application, a gateway device stores subscription and presence indicators according to buddy list information and the like, extinguishes dialogs, and so on. If a gateway device fails to function correctly (e.g., the gateway device crashes) the dialog information (e.g., details such as subscription and presence indicators) may be lost, causing disruption in the functionality and operation of the communications. This is particularly an issue with applications having long lived dialogs as typically with instant messaging applications, however, such problems are also issues for other applications such as VoIP and others.

SUMMARY

According to one aspect and one example of the present invention, gateway apparatus for facilitating communications using a stateful communication protocol (e.g., SIP or SIP/SIMPLE protocol) is provided. In one example the gateway apparatus includes a plurality of gateway devices (e.g., gateway servers) and a remote dialog store, wherein each of the plurality of gateway devices comprises export logic for causing dialog information associated with a first incoming message (e.g., a received message initiating a call-leg/dialog) to be communicated to the dialog store, and retrieval logic for causing a lookup of the dialog information in response to subsequent messages (e.g., one or more second received message subsequent to the first received message), the subsequent messages associated with the dialog of the first received message. The relationship between the first received message and subsequent received message(s) may be identified by one or more suitable dialog identifiers within the received message (e.g., call-id, from, to, and tag for SIP dialog). The gateway devices may validate and route the subsequent messages based on the dialog information accessed from the remote store.

In one example the gateway devices are stateless, thereby relying on the dialog store for validating and routing messages. In another example, the gateway devices are stateful and utilize the dialog store for backup purposes (e.g., if a gateway device becomes disabled or crashes). In one example, the gateway devices may be configured for receiving and processing messages according to SIP protocol or SIP/SIMPLE protocol.

The dialog store may be partitioned and may spawn across multiple hosts, where each host stores the dialog information in an in-memory database, thereby avoiding disk I/O and potentially improving throughput of the system. Each partition of the dialog store may include a back-up partition on a different server or device for additional redundancy and fail over purposes. Further, in one example, dialog information is serialized for storage in and retrieval from the dialog store.

The apparatus may further include a timer service for tracking dialog information and causing the termination (or renewal) of dialogs (e.g., by signaling the gateway devices). The timer service may be remote to the gateway devices and the dialog store or may be included with one or both.

In another example, an apparatus (e.g., a gateway device or gateway server) includes store logic for causing the storage of received dialog information with a remote storage, the received dialog information associated with a state of a received message, and retrieval logic for causing the lookup of the dialog information from the remote storage. The store logic may cause the storage of the dialog information in response to a first message (e.g., a message establishing a call-leg/dialog) and the retrieval logic may cause the lookup of the dialog information in response to subsequent messages associated with the first message.

According to another example, a method for facilitating communications according to a stateful communication protocol is provided. In one example, the method includes storing dialog information with a remote storage, the dialog information associated with state of a first message, and accessing the dialog information from the remote storage in response to receiving subsequent messages associated with the first message. The method may further include validating and routing the subsequent messages based on the dialog information.

According to another example, computer-readable medium comprising instructions for facilitating a stateful communication protocol is provided. In one example, the instructions are for causing the performance of a method including storing dialog information with a remote storage, the dialog information associated with state of a first message, and accessing the dialog information from the remote storage in response to receiving subsequent messages associated with the first message. The instructions may further cause validating and routing the subsequent messages based on the dialog information.

The present invention and its various aspects are better understood upon consideration of the detailed description below in conjunction with the accompanying drawings and claims.

DETAILED DESCRIPTION

Figure 1:
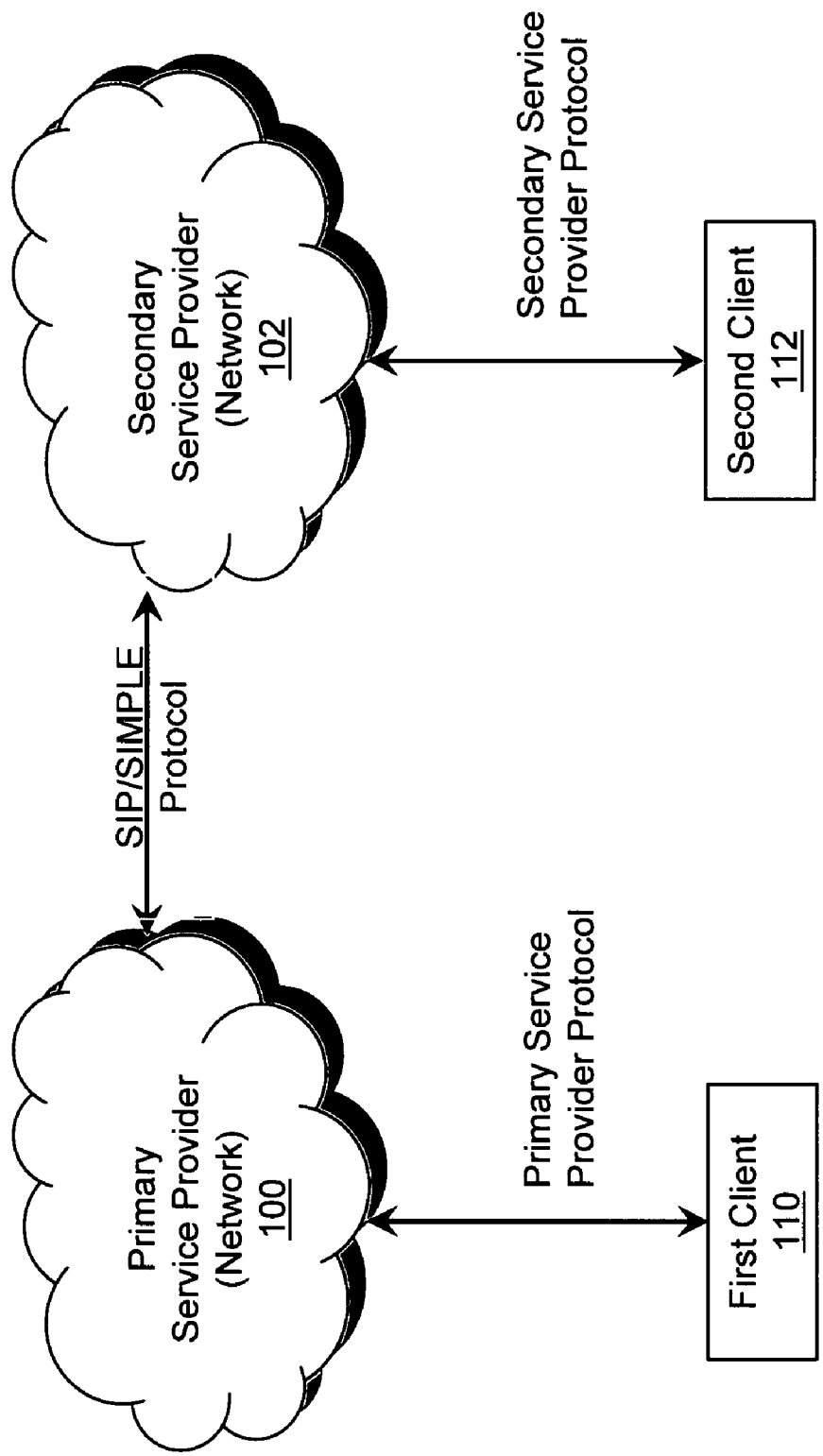
FIG. 1 schematically illustrates an exemplary system and environment for communication between two clients.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

A common protocol for communication between similar or disparate networks or systems includes Session Initiation Protocol ("SIP"). SIP is a generic signaling framework used in a wide variety of applications to negotiate and maintain session characteristics between two end points, particularly with respect to instant messaging application and VoIP. SIP maintains a considerable amount of state for each session in the form of dialogs. For example, many SIP stacks are available that manage the state of these dialogs in process memory (e.g., of a SIP gateway device), however, once the process is terminated, the state is lost.

A loss of the dialog information (e.g., the state of a dialog) may severely limit the fault-tolerance of stateful SIP proxies (e.g., gateways) where one end of the call-leg/dialog is maintained. For example, an end user may experience broken functionality or a disconnected call depending on the type of application. The problem becomes particularly evident when dialogs are stored for longer periods of time such as when SIP is used in conjunction with Instant Message & Presence protocol (SIMPLE). For example, SIMPLE suggests using SIP subscription dialogs to keep track of buddy's presence, where it is not uncommon to have dialogs present for many hours or days (in contrast to a typical VoIP application where dialog lifetime is generally the duration of the call, e.g., on the order of minutes to hours).

When a stateful gateway device such as a stateful SIP gateway fails to function correctly (e.g., crashes or goes down), recovering the dialog information stored therewith is generally difficult and may cause disruptions or delay in the functionality of applications; for example, the SIP gateway may take hours or more to refresh and restore the dialog information. The disruptions and delay may be particularly problematic when attempting to store long-lived dialog information such as subscription information for an instant messaging application.

Accordingly, in one example provided herein, stateless gateway devices are operable to export dialog information to a remote storage, e.g., a dialog store. Subsequent messages on existing dialogs may cause the particular stateless gateway device for which a message is directed to lookup the dialog store, validate the message, and route the message accordingly. The dialog store may include a common, shared storage device, used by multiple associated gateway devices such that a problem with any single gateway server (e.g., a crash) should have little or no affect on the functionality to the end users.

In another example, the gateway devices are at least partially stateful (storing at least some dialog information locally, e.g., with local processing memory or cache), and additionally exporting dialog information to a remote storage. Storing the dialog information locally may increase the speed and responsiveness of the individual gateway devices when responding to and routing messages, whereas the remote storage may provide fault tolerance and reduced disruptions due to the loss of any single gateway device within the system.

Initially, and with reference to FIG. 1, an exemplary environment is illustrated in which some aspects described herein may be used. The examples are described generally for an instant messaging application, and in particular, for an instant messaging application for use across similar or disparate service provider networks. It will be recognized by those of ordinary skill in the art, however, that the exemplary system may be adapted for other applications, such as VoIP and the like for communication between two or more clients within one or more networks.

Broadly, a first service provider network 100 (e.g., an IM service provider network, VoIP service provider network, etc.) having a plurality of first clients 110 logged in, e.g., via a first service provider protocol, and a second service provider network 102 having a plurality of second clients 112 logged in, e.g., via a second service provider protocol, are illustrated. The first and second service provider networks 100, 102 communicate to enable the first client 110 to send and receive instant messages with the second client 112. In one example, the communication is between the first and second networks 100, 102 directly, e.g., between respective servers or other network components of each network (as opposed to first client 110 communicating directly to second network 102 or second client 112 communicating directly to first network 100).

The first and second service provider networks 100, 102 may communicate, at least in part and in one example, via Session Initiation Protocol ("SIP") and Session Initiation Protocol for Instant Messaging and Presence Leveraging Extensions ("SIMPLE") based protocol. SIP/SIMPLE is illustrative of one protocol for intercommunication and interoperability between a first and second IM service provider for IM and presence functionality. Further, SIP/SIMPLE may support server-to-server interoperability for voice, video, and the like to enable VoIP applications.

In one example, the specific SIP/SIMPLE protocol for Server-to-Server Interoperability purposes includes SIP RFC 3261, SIP RFC 3265, and/or PIDF RFC 3863. Additionally, communication between the networks may communicate Server-to-Server over Transmission Control Protocol (TCP) with desired levels of security and IP filtering.

Those of ordinary skill in the art will recognize that various other communication protocols (whether open or proprietary) are possible and contemplated whether used alone or in combination with other communication systems/methods. Various modifications may be made to the SIP/SIMPLE protocol depending, for example, on the particular IM service providers and functionality desired. For example, one may modify any well known protocol such as SIP/SIMPLE to be used more efficiently (e.g., with respect to transmission speed, process, cost, etc.) within a given network. Further, other suitable communication protocols such as Extensible Messaging and Presence Protocol (XMPP) or the like that enable or facilitate communication and/or interoperability between similar or disparate network protocols may be used alone or in combination with the SIP/SIMPLE protocol.

Clients 110 and 112 may include, for example, a user accessing IM accounts via an internet browser, a personal computer, mobile device, such as a cellular phone or laptop personal computer and the like. A user is typically connected via a network (such as the Internet or an intranet) to one or more servers including a respective IM service provider for the particular user IM account. The network may further include various other servers such as a gateway server, proxy server, account server, email server, mobile server, and the like, which will be described in greater detail below.

A client via a computer device may communicate via a wireless network, such as a wireless gateway, e.g., a cellular, satellite, or other wireless network. Additionally, the computer device may communicate via a non-wireless network such as a cable or fiber optic network, or a combination of wireless and non-wireless systems. The computer device may include suitable hardware and software, such as a processor connected to an input device such as a keyboard, a network interface, a memory, and a display. The memory may include logic or software operable with the device to perform some of the functions described herein. The device may be operable to include a suitable interface for a messaging facility, such as an email inbox, instant messaging (IM), short messaging service (SMS), multimedia messaging service (MMS), voice, video, and the like. The device may further be operable to display a web browser for accessing the Internet or user accounts, including webmail environments such as a Yahoo!® mail account or Hotmail® account, for example.

First and second networks 100, 102 may be in communication with or include one or more server and database systems in communication with one another and capable of wirelessly communicating with devices of a plurality of users. Exemplary server systems may include various routers, databases, gateways, and servers, such as an edge or proxy server, a gateway server, a mobile server, email sever, web server, voice messaging server, and the like. Further, networks 100, 102 may include a wireless network and one or more local area networks (LANs) and/or wide area networks (WAN), such as the Internet, that enables communication between various users, devices, servers, agents, modules, clients, processors, and the like.

Figure 2:
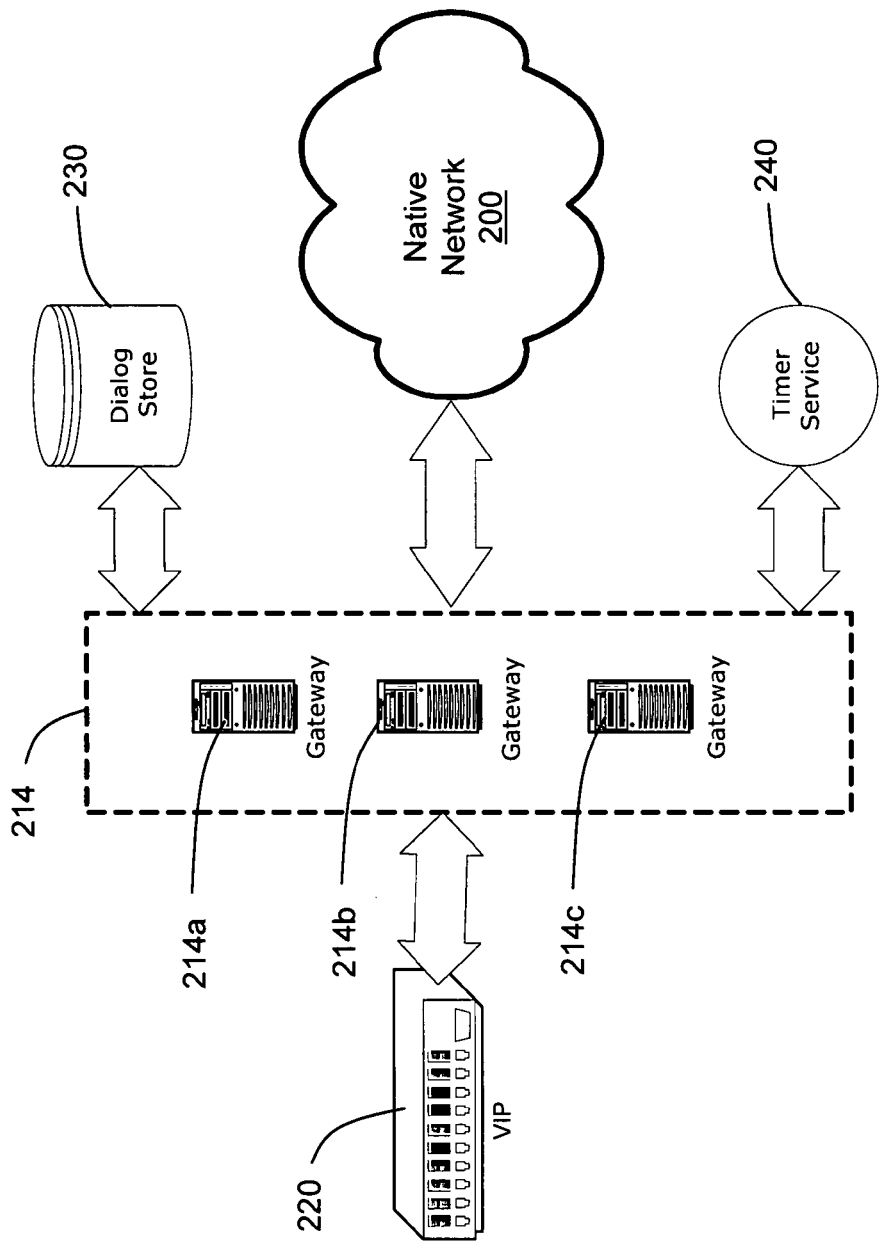
FIG. 2 schematically illustrates an exemplary stateless gateway system and associated components.

FIG. 2 schematically illustrates an exemplary stateless gateway system 214 according to one example, and which may be associated with one or both of the networks 100, 102 of FIG. 1. The exemplary gateway system 214 communicates with a dialog store 230 and timer service 240, all of which may be associated with a single network for inter and/or intra network communications. Further, the gateway system 214 may be used for facilitating communications according to a stateful protocol such as SIP, SIP/SIMPLE, and the like.

In this particular example, traffic (e.g., a request) generally flows into native network 200 through a Virtual IP address device (VIP) 220 and a gateway system 214 including at least one gateway device 214a-214c (and vice versa for traffic, e.g., a SIP response, from native network 200).

Gateway system 214 includes a plurality of stateless gateway devices 214a-214c operable to export dialog information (or dialog information) associated with communications flowing through gateway devices 214a-214c (to and from native network 200) to a remote storage. In particular, as a call-leg/dialog is established upon the receipt of a first message, the particular gateway device 214a-214c receiving the message exports the dialog information for storage with remote dialog store 230. For example, each gateway device 214a-214c includes export logic for causing the dialog state and associated information to be exported to dialog store 230 when establishing a call-leg/dialog. The dialog may be initiated, for example, by a SIP INVITE, SUBSCRIBE request, or the like.

In one example, all subsequent messages (e.g., a response or request) associated with existing dialogs stored with one of the gateway devices 214a-214c results in the appropriate gateway 214a-214c to lookup and retrieve the dialog information from dialog store 230, validate the message, and route the message accordingly. Accordingly, each gateway device 214a-214c further includes retrieval logic for causing the lookup and retrieval of dialog information previously stored with dialog store 230. If one of the gateways 214a-214c looks-up dialog information stored with dialog store 230 and fails to find the information an error response may be sent to the sender (from which the sender may request to establish a new dialog and re-send the message).

One advantage of making gateway devices 214a-214c stateless includes that messages may be routed through any one of gateway devices 214a-214c (as opposed to the original gateway device having the dialog information stored therewith). This may improve load balancing of the gateways by routing messages based on load as opposed to using the previous or original gateway device associated with a particular message.

Dialog store 230 is illustrated as a single device in FIG. 2, however, in practice, dialog store may include multiple devices in communication with gateway devices 214a-214c. In one example, dialog store 230 is partitioned and may spawn across multiple hosts, wherein each host stores the data (e.g., the dialog information) in an in-memory database, thereby avoiding disk I/O and potentially improving throughput of the system. Each partition of dialog store 230 may further include a back-up partition on a different server or device for additional redundancy and fail over purposes.

Further, in one example, dialog information is serialized for storage in and retrieval from dialog store 230. Accordingly, dialog information may be serialized by the gateway device 214a-214c, dialog store 230, another component, or combinations thereof. Further, the serialized data retrieved from dialog store 230 may be deserialized prior to use by gateway devices 214a-214c.

Dialog store 230 may include a passive storage device (note that dialog store may be active in other examples), and gateway devices 214a-214c may be stateless (note that gateway devices 214a-214c may be at least partially stateful in other examples). Accordingly, in one example a timer service 240 may be used to track call-leg expirations and communicate triggers to gateway devices 214a-214c for expiring dialogs. Timer service 240 may track expiration times of all active dialogs and alert gateway devices 214a-214c, dialog store 230, or both of expirations. In one example, gateway device 214a-214c, in response to an alert received from timer service 240, may cause the retrieval of the dialog information from dialog store 230 and take appropriate action, e.g., to refresh or terminate the dialog information.

Timer service 240 may include a device remote to gateway devices 214a-214c and dialog store 230, and include logic for carrying out the described functions. In other examples, dialog store 230 and/or gateways 214a-214c may include functionality to track call-leg expirations to communicate triggers and expire dialogs without (or in conjunction with) timer service 240. Further, timer service 240 may be included with a device or devices associated with dialog store 230.

Although not shown, the architecture of FIG. 2 may include or communicate with various additional components such as an edge proxy, gateway event servers, session managers, various databases, and the like. One particular use of the stateless gateway architecture described herein includes facilitating an instant messaging application that may be used for communicating between similar or disparate networks. For example, a stateless gateway architecture may be used with that described in copending U.S. patent application Ser. No. 11/528,753, filed Sep. 27, 2006, entitled INSTANT MESSAGING INTEROPERABILITY BETWEEN DISPARATE SERVICE PROVIDERS, which is hereby incorporated by reference as if fully set forth herein.

Figure 3:
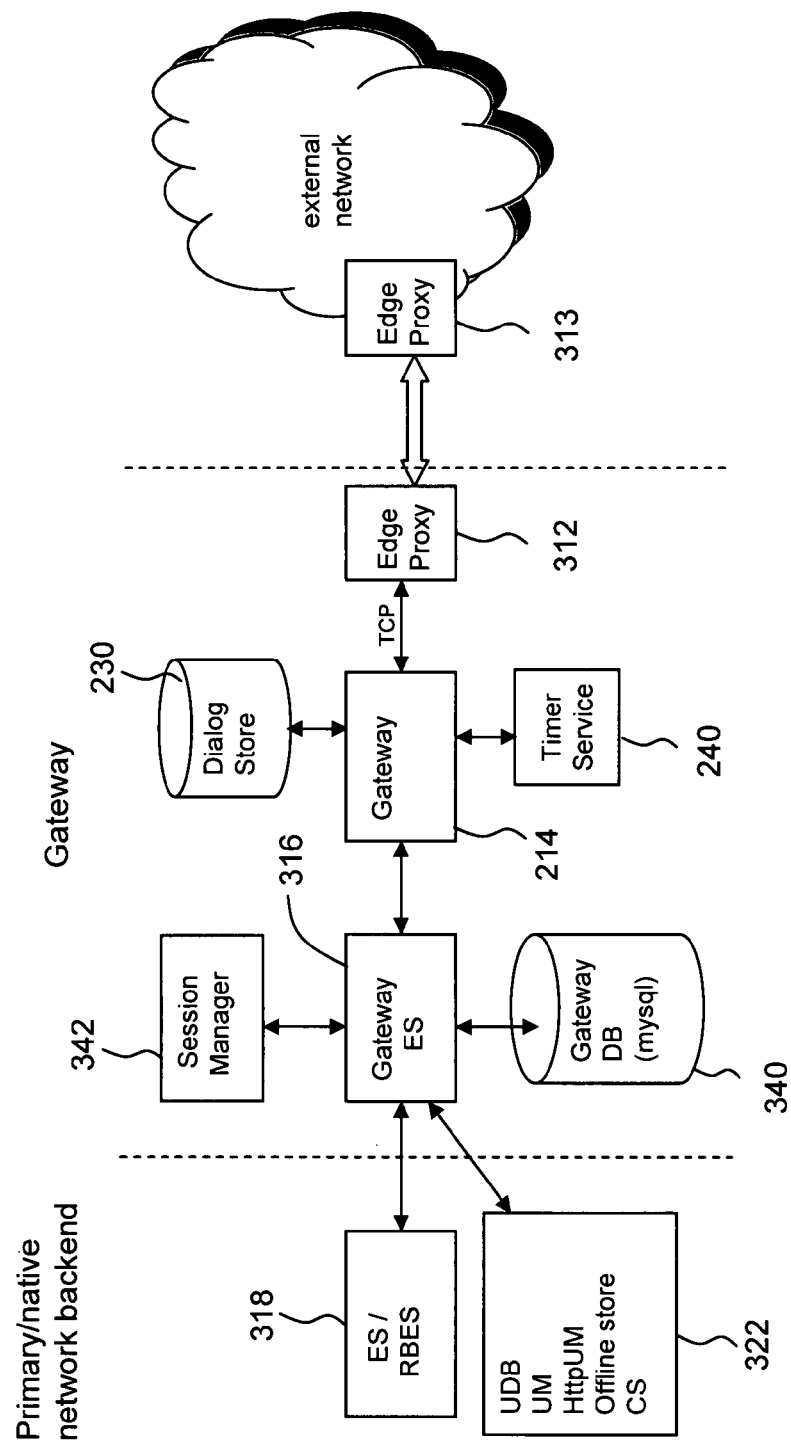
FIG. 3 schematically illustrates an exemplary network backend associated with a network provider in communication with an external network.

FIG. 3 illustrates an overview of an exemplary IM service provider network in which some aspects described herein may be used. It will be recognized that similar architectures may be used for other applications using stateful communication protocols, such as VoIP and the like. Further, not all the components may be required, and variations in the arrangement and type of the components may be made without departing from the spirit and scope of the various inventions.

In this example, an edge proxy 312 is provided for access control, provisioning, and routing to and from an external network, as well as for connection pooling and forwarding messages (e.g., SIP/SIMPLE messages) to and from the external network. Generally, edge proxy 312 is operable and configured to communicate with one or more domains. Edge proxy 312 is optional, and in other examples, gateway system 314 may communicate directly to another server or network component (for example, directly with an edge proxy 313 or gateway of another network). Implementing a generic edge proxy 312, however, may make it easier to federate with more than one external network. The inclusion of edge proxy 312 may also help centralize the federation routing and connection handling to one or more external networks.

Gateway system 214, including one or more gateway devices in communication with a remote dialog store 230 and timer service 240, operates to proxy primary network clients as end points to the external network, map primary network instant messaging requests into SIP/SIMPLE messages, for example, and vice versa. In one example, gateway system 214 relies on a SIP stack (e.g., an Open source SIP stack, commercial SIP stack, or a proprietary SIP stack), and is stateless (e.g., the dialog information stored with dialog store 230 and tracked via timer service 240 as described previously). Thus, gateway system 214, e.g., gateway servers included therein, have logic operable to translate messages, e.g., SIP/SIMPLE communications/events/etc. into native or primary protocol communications within the backend of network 200 and vice versa.

Gateway Event Server (GWES) 316 generally operates to handle interdomain gateway requests (mainly IM and presence in this example) and bridges gateway system 214 and one or more native network backend servers. GWES 316 is, in one example, stateless and highly scalable.

The architecture further includes a Session Manager (SM) 342, which may store dialog routing information for the backend servers of the native network. For example, each record may be keyed by a primary network client id, gateway id, and dialog type (IM, presence, etc.), and contains a gateway key pointing to the particular gateway device/server of gateway system 214 that holds the corresponding dialog (if the gateway devices are partially stateful; otherwise the gateway key may point randomly, according to a load balancing algorithm, or not be saved/used). In one example, session manager 342 uses in memory cache management, a scalable distributed caching mechanism, which may support data partition and peer replication, but other implementations are possible.

Gateway Database (GWDB) 340 stores persistent information for external users (for example, buddy lists or other information). In one example, MySQL server is used as persistent storage. In one example, the GWDB 340 is configured to support data partition and peer replication, but lacks connection pooling capability. Of course, other configurations are contemplated depending upon the particular application.

Additional support from various other servers on the native network backend may be included. For example, in an instant messaging environment, es/rbes 318 may be operable to store and retrieve internal or external id's in reverse buddy lists. Additionally, various databases and servers, such as offline stores and connections servers may be include at 322.

It will be recognized that FIG. 3 illustrates one implementation of exemplary architecture for communicating with an external network; however, various other architectures are possible. For example, various components may be deleted and/or their functionality combined with other components.

Figure 4:
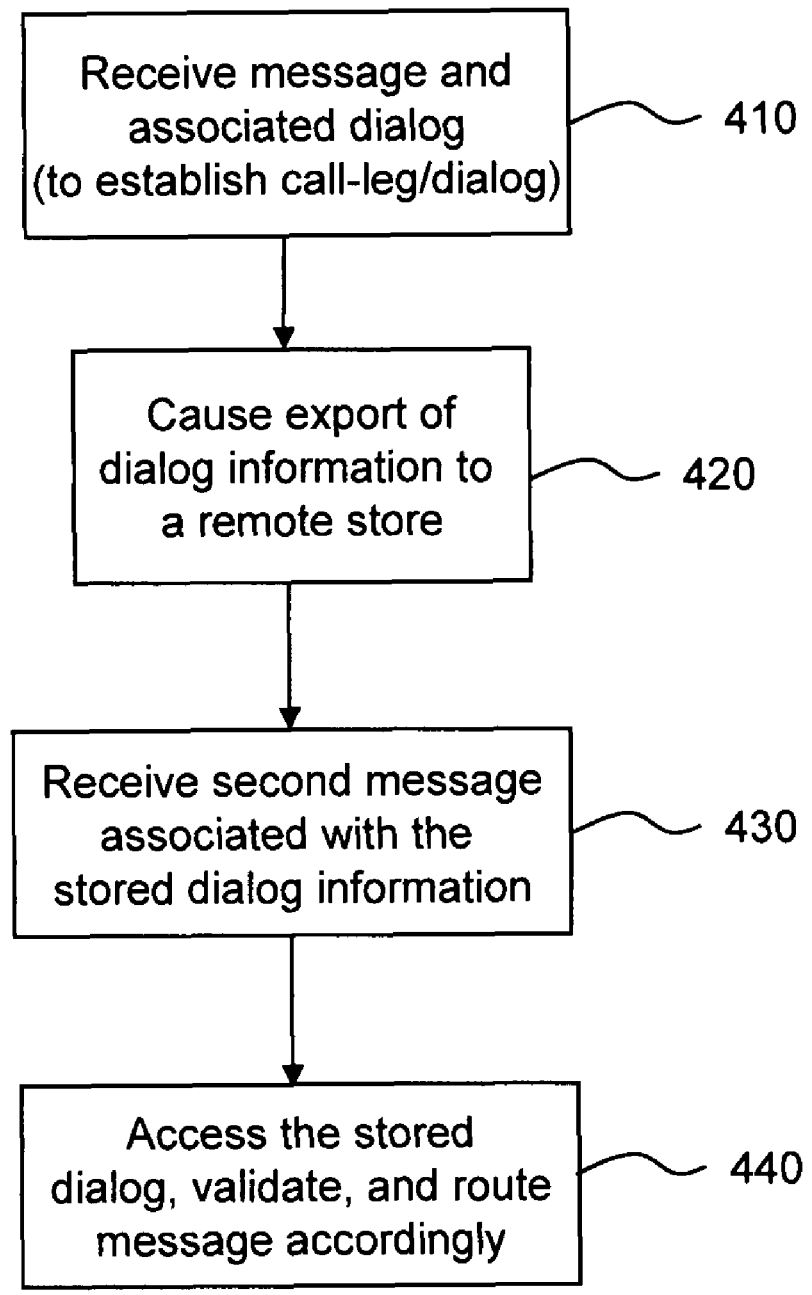
FIG. 4 illustrates an exemplary method for handling messages.

FIG. 4 illustrates an exemplary method for facilitating communication according to a stateful protocol. The exemplary method may be carried out by one or more gateway devices and be caused by logic included therewith. Further, in one example, a computer-readable medium may comprise instructions for causing the performance of the exemplary method.

Initially, a first message and associated dialog are received at 410, the message initiating a call-leg/dialog. For example, the first message may be received by a stateless or stateful gateway device. In response to receiving the first message for initiating a call-leg/dialog, dialog information associated therewith is exported to a remote storage at 420. For example, a gateway device may include logic operable to export the dialog information of the first message to a remote storage. In some examples, the dialog information is also stored in local memory (e.g., where the gateway device is stateful).

A subsequent or second associated with the dialog of the first message is received at 430. For example, the same gateway device that received the fist message, or a gateway device in communication with a common dialog store, receives the second message. In response to receiving the second message, the stored dialog information is accessed and used to validate and route the second message accordingly. For example, the gateway device receiving the second message may include logic for causing the lookup of the dialog information in response to receiving the second message, and further include logic for causing the validation and routing of the second message. Similar actions may occur for all subsequent messages associated with the dialog of the first received message.

While aspects of the invention, including the above described method, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 5:
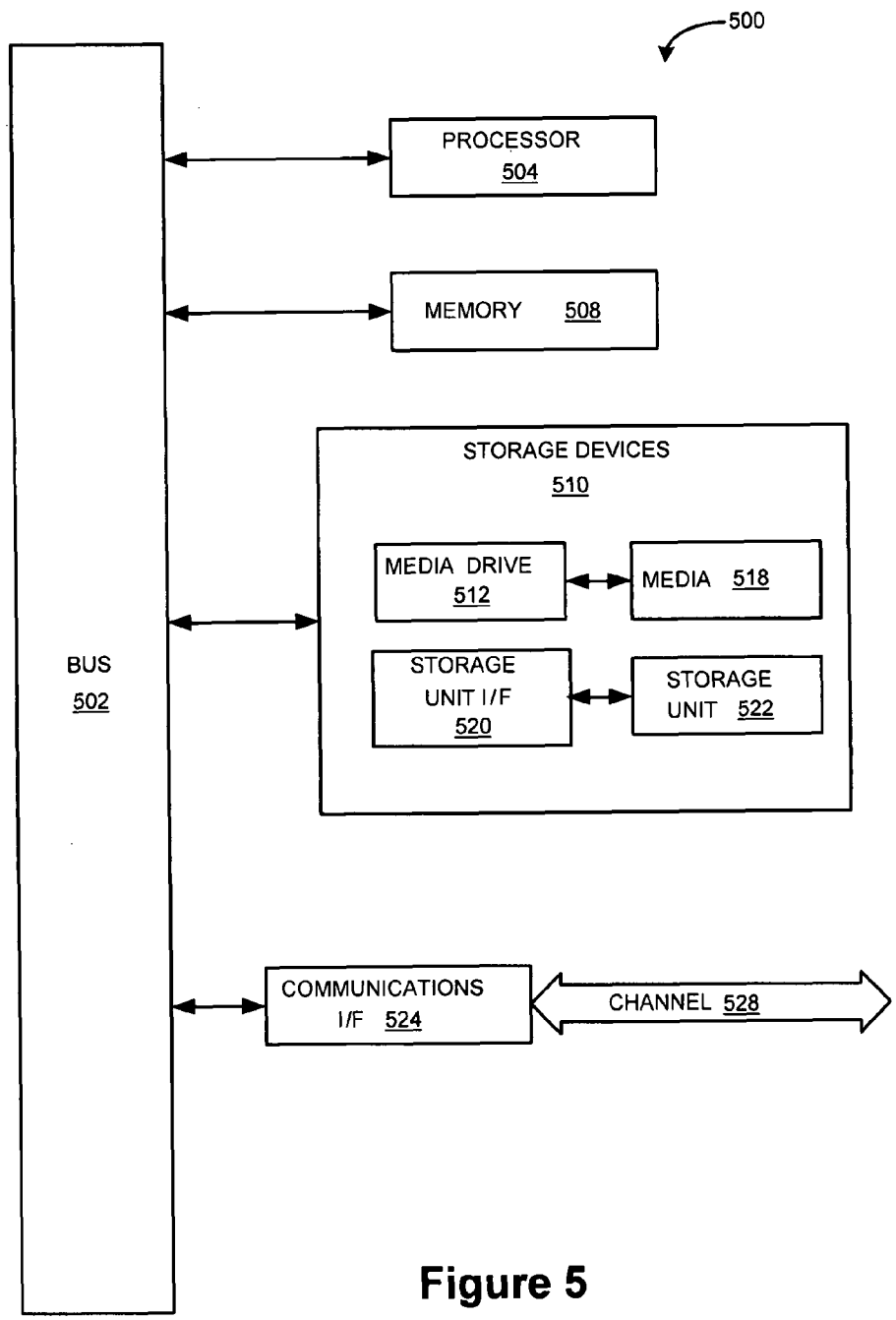
FIG. 5 illustrates an exemplary computing system that may be employed to implement processing functionality for various aspects of the invention.

FIG. 5 illustrates an exemplary computing system 500 that may be employed to implement processing functionality for various aspects of the invention (e.g., as a gateway device/server, dialog store, timer service logic, combinations thereof, and so on). Those skilled in the relevant art will also recognize how to implement the invention using other computer systems or architectures. Computing system 500 may represent, for example, a desktop, mainframe, server, client, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communication medium.

Computing system 500 can also include a main memory 508, for example random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory ("ROM") or other static storage device coupled to bus 502 for storing static information and instructions for processor 504.

The computing system 500 may also include information storage mechanism 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 518 may include, for example, a hard disk, floppy disk, magnetic tape, optical disk, CD or DVD, or other fixed or removable medium that is read by and written to by media drive 514. As these examples illustrate, the storage media 518 may include a computer-readable storage medium having stored therein particular computer software or data.

In alternative embodiments, information storage mechanism 510 may include other similar instrumentalities for allowing computer programs or other instructions or data to be loaded into computing system 500. Such instrumentalities may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a USB port), a PCMCIA slot and card, etc. Software and data transferred via communications interface 524 are in the form of signals which can be electronic, electromagnetic, optical, or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 508, storage device 518, storage unit 522, or signal(s) on channel 528. These and other forms of computer-readable media may be involved in providing one or more sequences of one or more instructions to processor 504 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into computing system 500 using, for example, removable storage drive 514, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. An apparatus comprising:
    a dialog store; and
    a plurality of gateway devices located remotely to the dialog store and connected to the dialog store via a first network, each device gateway comprising:
        a respective processor;
        a respective storage medium for tangibly storing thereon program logic for execution by the processor, the program logic comprising:
            export logic for causing dialog information associated with a first received message to be communicated to the dialog store, such that the first received message initiates a dialog, the dialog comprising a stateful communication session between a first end point in the first network and a second end point in a second network, and such that the dialog information comprises state information of the dialog;
            retrieval logic for accessing the dialog information in response to a second received message subsequent to the first received message and associated with the first received message and the dialog;
            validation logic for validating and routing the second received message based on the dialog information;
    a timer located remotely to the dialog store and the plurality of gateway devices connected to the plurality of gateway devices and the dialog store via the first network for:
        tracking dialog information for a plurality of dialogs, each dialog of the plurality of dialogs being associated with a respective gateway device of the plurality of gateway devices, the dialog information comprising call-leg expirations for the respective dialog; and
        for each dialog of the plurality of dialogs, causing the termination or renewal of the respective dialog by signaling the dialog store and the respective gateway device of the plurality of gateway devices with which the respective dialog is associated; and
    a session manager device connected to the plurality of gateway devices via the first network, session manager device comprising:
        a processor;
        a storage medium for tangibly storing thereon program logic for execution by the processor, the program logic comprising:
            routing logic for routing the first received message to a first gateway device of the plurality of gateway devices and routing the second received message to a second gateway device of the plurality of gateway devices, the second gateway device being a different gateway device from the first gateway device, the second message being routed to the second gateway device based on a load of the first gateway device and a load of the second gateway device.

2. The apparatus of claim 1, such that the retrieval logic further causes the lookup of the dialog information in response to all subsequent received messages associated with the dialog information of the first received message.

3. The apparatus of claim 1, such that each of the gateway devices is stateless.

4. The apparatus of claim 1, such that each of the gateway devices is stateful.

5. The apparatus of claim 1, such that the dialog information is both exported to the dialog store and further stored in a local memory of the gateway device.

6. The apparatus of claim 1, wherein the first message originates in the first network and the second message originates in the second network.

7. The apparatus of claim 1, wherein when dialog information is communicated to the dialog store, the dialog information is serialized on the dialog store, and when dialog information is accessed, the dialog information is deserialized.

8. A method comprising:
    routing a first message to a first computing device of a plurality of computing devices;
    receiving, using the first computing device of a plurality of computing devices associated with a first network, the first message and dialog information associated with a state of a dialog initiated by the first message, such that the dialog comprises a stateful communication session between a first end point in the first network and a second end point in a second network;
    storing, using the first computing device, the dialog information with a remote storage;
    routing a second message associated with the first message to a second computing device of the plurality of computing devices, the second computing device being a different computing device from the first computing device, the second message being routed to the second computing device based, in part, on a load of the first computing device and a load of the second computing device;
    receiving, using the second computing device of the plurality of computing devices, the second message associated with the first message and the dialog, the second computing device being a different computing device from the first computing device;
    accessing, using the second computing device of the plurality of computing devices, the dialog information from the remote storage;
    validating and routing, using the second computing device of the plurality of computing devices, the second message based on the dialog information;
    tracking, using a remote timer, call-leg expirations for the dialog; and
    based on tracking call-leg expirations for dialog, signaling, using the remote timer, the first computing device of the plurality of computing devices, the second computing device of the plurality of computing devices and the remote storage to perform an action selected from the list: terminate the dialog and renew the dialog.

9. The method of claim 8, such that the dialog information is stored only with the remote storage.

10. The method of claim 8, further comprising storing the dialog information in a local memory.

11. The method of claim 8, wherein the first message originates in the first network and the second message originates in the second network.

12. The method of claim 8, wherein second message is routed to the second computing device based on a load of the first computing device and a load of the second computing device.

13. The method of claim 8, wherein when the dialog information is stored with the remote storage, the dialog information is serialized, and when the dialog information is accessed from the remote storage, the dialog information is deserialized.

14. A non-transitory computer-readable storage medium for tangibly storing thereon computer readable instructions for a method comprising:
  routing a first message to a first computing device of a plurality of computing devices;
  receiving, using the first computing device of a plurality of computing devices associated with a first network, the first message and dialog information associated with a state of a dialog initiated by the first message, such that the dialog comprises a stateful communication session between a first end point in the first network and a second end point in a second network;
  storing, using the first computing device, the dialog information with a remote storage;
  routing a second message associated with the first message to a second computing device of the plurality of computing devices, the second computing device being a different computing device from the first computing device, the second message being routed to the second computing device based, in part, on a load of the first computing device and a load of the second computing device;
  receiving, using the second computing device of the plurality of computing devices, the second message associated with the first message and the dialog, the second computing device being a different computing device from the first computing device;
  accessing, using the second computing device of the plurality of computing devices, the dialog information from the remote storage;
  validating and routing, using the second computing device of the plurality of computing devices, the second message based on the dialog information;
  tracking, using a remote timer, call-leg expirations for the dialog; and
  based on tracking call-leg expirations for dialog, signaling, using the remote timer, the first computing device of the plurality of computing devices, the second computing device of the plurality of computing devices and the remote storage to perform an action selected from the list: terminate the dialog and renew the dialog.

15. The non-transitory computer-readable storage medium of claim 14, further comprising computer readable instructions for storing the dialog information in a local memory of each of the plurality of computing devices.

16. The non-transitory computer-readable storage medium of claim 14, wherein the first message originates in the first network and the second message originates in the second network.

17. The non-transitory computer-readable storage medium of claim 14, wherein second message is routed to the second computing device based on a load of the first computing device and a load of the second computing device.

18. The non-transitory computer-readable storage medium of claim 14, wherein when the dialog information is stored with the remote storage, the dialog information is serialized, and when the dialog information is accessed from the remote storage, the dialog information is deserialized.

* * * * *